April 15, 1924.

O. E. BARTHEL 1,490,553

GREASE GUN

Filed March 12, 1921

Inventor
Oliver E. Barthel,
By
Attorneys

Patented Apr. 15, 1924.

1,490,553

UNITED STATES PATENT OFFICE.

OLIVER E. BARTHEL, OF DETROIT, MICHIGAN.

GREASE GUN.

Application filed March 12, 1921. Serial No. 451,925.

*To all whom it may concern:*

Be it known that I, OLIVER E. BARTHEL, a citizen of the United States of America, residing at Detroit, in the county of Wayne and State of Michigan, have invented certain new and useful Improvements in Grease Guns, of which the following is a specification reference being had therein to the accompanying drawings.

In the automobile or motor vehicle industry grease cups are gradually being dispensed with as lubricant containers for supplying bearings, springs, shackles and other movable or wearing parts with lubricant, and, instead, grease pumps or "guns" are being used for squirting or forcibly feeding a lubricant to the point to be lubricated.

The majority of grease pumps are of the cylinder type in which grease or a capsule of grease is placed and forced therefrom, either through a hose to an inaccessible oil port or sometimes direct into the port, and a piston is arranged in the cylinder to be reciprocated by hand or by some additional power, as screw threads, a rack and pinion, or the like, to force the lubricant from the cylinder.

The grease or lubricant used in the pumps ordinarily comes in large quantities and is placed in a pump cylinder by using a paddle, spoon or other transferring implement. At its best, the lubricant transferring operation is a dirty one. The grease, being of a semiliquid or jelly like consistency will not, under normal atmospheric conditions, freely flow from a can into a pump cylinder, so it is very often necessary to pack the grease in the pump cylinder. This may be accomplished by shaking or jarring the cylinder and all operations incident to the filling of the pump cylinder are liable to cause dirty hands and soiled clothes.

My invention aims to render the loading of a grease pump comparatively easy by providing a self loading pump, that is, one into which grease may be sucked, by a reduction of atmospheric pressure in the pump, and then ejected by the same loading means. This is accomplished by a novel form of piston, which, in accordance with this and other inventions, may take various forms.

First, the piston is cut, stamped and pressed from sheet metal and in its preferred form has two opposed annular feather or knife edges.

Second, the piston may take the form of a single feather edge self adjusting or floating piston guided by a skirt.

Third, working out of these various forms of pistons naturally suggested others, some of which are delineated in this application and others covered by the appended claims.

The principal object of my invention, as set forth in the beginning, is the loading of a grease pump by a retractile stroke of the pump piston. This, to the best of my knowledge, has never been done before, because the pistons now in use will not produce enough suction to raise grease into the pump cylinder. To lift such a lubricant there must be a positive air sealing fit between the piston and the pump cylinder walls to maintain a high reduction of atmospheric pressure or partial vacuum on the lubricant side of the piston, and at the same time not such a fit as would preclude movement of the piston by direct hand power or hand operated power instrumentalities. I have found the feather or knife edge piston best suited for this purpose, and by using a double edge piston or back to back piston, I gain the second object of my invention, namely:—

By using a feather edge on the lubricant side of the piston the flanged piston wall is compressible against the pump cylinder wall by lubricant contacting therewith consequently a grease may be ejected from the cylinder, by the piston, without any danger of the lubricant passing from one side of the piston to the other, and eventually rendering the pump inoperative.

A further object of my invention is to furnish a pump cylinder with a sheet metal resilient piston, no greater in diameter than the pump cylinder, and connect the piston to its operating means so that it may have a self adjusting action within the pump cylinder and thus permit all walls of the piston to uniformly engage the walls of the cylinder. This will prevent uneven wear and contribute towards a perfect seal between the periphery of the piston and the cylinder wall. The construction which permits of a universal connection between the piston and its operating means also prevents the feather edges of the piston from being injured by contact with the end walls of the pump cylinder.

A still further object of my invention is to provide piston operating means for a feed pump which permits of a slow or fast speed of the piston within the pump cylinder, the slow and powerful speed being employed when ejecting a lubricant and the fast speed being employed when drawing a lubricant into the pump cylinder. The manner of articulating the piston operating means relative to a pump cylinder permits of either speed being selected and the change from one to the other can be easily accomplished.

Considering the grease pump and various forms of pistons that may be used in a pump cylinder, reference will now be had to the drawing, wherein—

Figure 1:
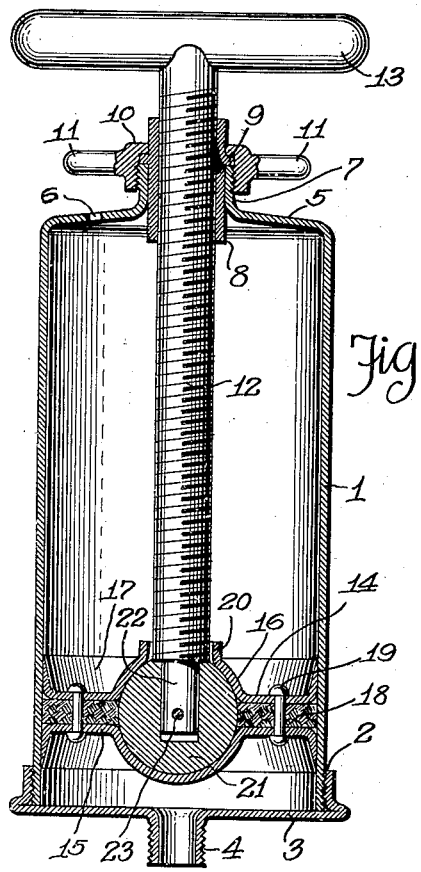
Figure 1 is a longitudinal sectional view of the preferred form of double acting piston in a pump cylinder in accordance with this invention.

In the drawing, the reference numeral 1 denotes a pump cylinder having its outer end exteriorly screwthreaded as at 2, to receive an end cap 3 having a central exteriorly screwthreaded nipple 4 which serves as an outlet for a lubricant placed within the cylinder 1. Ordinarily the end cap 3 is removed to load, by hand, the outer end of the pump cylinder 1 with heavy lubricant, and I remove the cap, but instead of loading by hand, I immerse or stick the end of the cylinder in the lubricant to be lifted into the pump cylinder. A hose or any other conduit may be attached to the nipple 4 so that after the cap is replaced, remotely located ports or parts may be lubricated.

The opposite end of the pump cylinder 1 has an end wall 5 provided with a pin hole or atmospheric port 6 and centrally of the end wall 5 is an exteriorly screwthreaded collar 7 in which is loosely mounted an interiorly screwthreaded sleeve 8, said sleeve extending into the pump cylinder 1 and in some instances may be of sufficient length to constitute an end abutment for the piston to prevent feather edges thereof from contacting with the end wall 5. The sleeve 8, intermediate the ends thereof, has a peripheral flange 9 which normally engages the outer end of the collar 7 and is retained thereon by a coupling member 10 provided with hand pieces 11, so that said coupling member may be easily adjusted relative to the collar 7.

In screwthreaded engagement with the interiorly screwthreaded sleeve 8 is a screw 12 having its outer end provided with a handle or cross head 13 which permits of the screw being rotated and fed through the sleeve 8, such slow feeding of the screw being used for lubricant ejection purposes. By unscrewing the coupling member 10 and releasing the sleeve 8 relative to the collar 7, the screw 12 may be bodily retracted through the collar 7, and such retraction is preferably used for pulling a lubricant into the pump cylinder 1. After the pump cylinder has been loaded the sleeve 8 may be screwed down on the screw 12 towards the end wall 5 and again locked relative to the collar 7. The screw 12 and the construction by which the screw is articulated relative to the pump cylinder 1 constitutes slow and fast operating means for a piston within the pump cylinder, and the piston will now be considered.

14 denotes an inner piston and 15 an outer piston, said pistons, in their embryo form being identical, each consisting of a disk-like body having a central semi-spherical enlargement 16 and a peripheral outstanding feather or knife edge flange 17. The pistons 14 and 15 are disposed back to back with a packing member 18 therebetween, said packing member being in the form of an annulus or washer made of felt or a yieldable wiping material. The pistons 14 and 15, with the clamping member 18 sandwiched therebetween, are riveted or otherwise connected together, as at 19, to form a unitary structure having a socket at its middle portion formed by the semi-spherical enlargements 16 of the pistons and the enlargement 16 of the piston 14 is cut and stamped to provide a central opening 20 in the socket.

21 denotes a ball member or head loose in the socket of the piston, and extending into the ball member 21 is the reduced end 22 of the screw 12, said screw extending through the opening 20. The reduced end 22 of the screw may be fixed in engagement with the ball member 21 by a transverse pin 23 or other fastening means, and the socket member will be shiftable relative to the screw 12 and thus permit of the piston being self adjusting on the ball member. By having the piston universally connected to the end of the screw 12, the flanges 17 of the pistons 14 and 15 may snugly fit against the inner wall of the pump cylinder 1, thus permitting of the screw 12 being freely moved relative to the cylinder 1 especially during a fast adjustment of a double or compound piston.

Figures 7, 8:
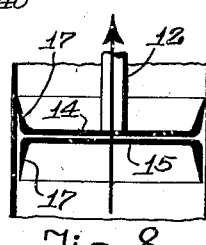
Figs. 7 and 8 are diagrammatic views showing the double acting piston under different operating conditions.

Before proceeding with a description of the various forms of pistons shown, I desire to direct attention to the diagrammatic views, Figs. 7 and 8 showing the action of the compound piston when reciprocated within the cylinder 1.

Assuming that the end cap 3 has been removed so that the pump cylinder 1 may be loaded with grease, the compound piston is placed at the open end of the pump cylinder and the pump cylinder immersed in the grease so that air cannot enter the open end of the pump cylinder. Then by retracting the compound piston a partial vacuum is produced above the grease by the inner piston 14 becoming active relative to the pump cylinder 1. The partial vacuum produced above the grease will cause the flange 17 of the inner piston to snugly engage the walls of the pump cylinder, and as the piston is retracted the grease will be lifted into the open end of the pump cylinder.

With the end cap 3 in place the grease may be ejected from the pump cylinder by the screw 12, for either a fast or slow ejection. In either instance, the outer piston 15 becomes active, as shown in Fig. 7, the flanges 17 of said outer piston snugly engaging the cylinder walls and preventing the grease from escaping between the compound piston and the cylinder walls. With such a piston the grease may be forcibly expelled from the pump cylinder and during the reciprocation of the piston the semi-spherical enlargement 16 will prevent the feather knife edge flanges 17 from being injured by contacting with the end cap 3 or the end wall 5 of the pump cylinder 1.

Figure 2:
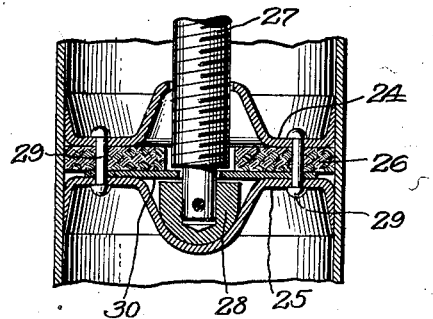
Fig. 2 is a longitudinal sectional view of another form of double acting piston.

Fig. 2 shows a compound piston having a universal or loose movement relative to a screw or piston rod 27, and the compound piston comprises an inner piston 24, an outer piston 25, a packing member 26, a slotted washer 30 and a head 28, said head being fixed on the reduced end of the screw or piston rod 27, between the slotted washer 30 and the outer piston 25. The slotted washer 30, packing member 26, inner piston 24, and outer piston 25 may be held in an assembled relation by rivets 29 or other fastening means. It will be noted that the slotted washer 30 loosely fits between the head 28 and the screw or piston rod 27, and with the openings in the packing member 26 and the inner piston 24, larger than the screw or piston rod 27, the compound piston may wobble relative to the screw or piston rod.

Figure 3:
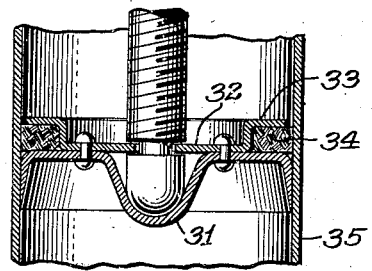
Fig. 3 is a similar view of a single acting piston.

Fig. 3 shows an outer piston 31, a slotted washer 32 provided with a peripheral flange 33 and a packing member 34 sandwiched between the outer piston 31 and the flange 33. The slotted washer 32 is riveted or otherwise connected to the outer piston 31 and this piston may have a wobbling movement relative to its screw or piston rod. This form of piston has a single feather or knife edge engaging the walls of the cylinder 35 and passage of a lubricant from one side of the piston to the opposite side thereof is prevented by the packing member 34 engaging the walls of the cylinder.

Figure 4:
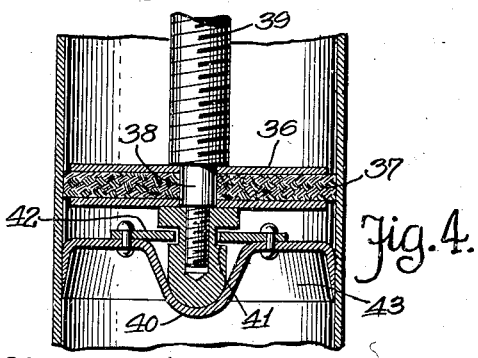
Fig. 4 is a similar view of a single acting piston provided with a skirt or guide.
Figure 5:
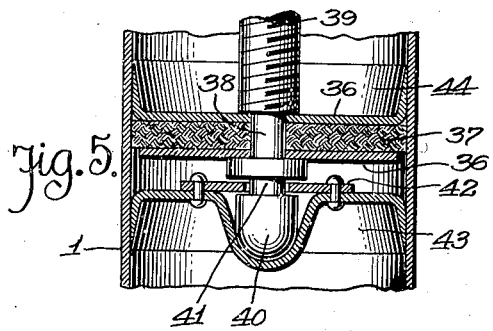
Fig. 5 is a similar view of a double acting piston a part of which serves as a skirt or guide.
Figure 6:
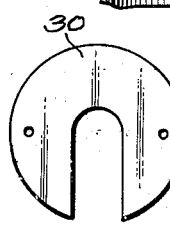
Fig. 6 is a plan of a slotted retaining member shown in Fig. 4.

Another form of single feather edge piston has been shown in Fig. 4 as provided with a skirt or guiding portion composed of two apertured disks 36 with a packing member 37 sandwiched therebetween. This packing follower or skirt is mounted on the reduced portion 38 of a screw or piston rod 39 and is retained on the reduced portion 38 by a nut or head 40 screwed on the reduced end of the screw or pinion rod 39. The nut or head 40 has an annular groove 41 and extending into said groove is a slotted washer 42 riveted or otherwise connected to an outer feather edge piston 43. The screw or piston rod 39 will at all times be maintained axially of a cylinder, but the outer piston 43 may have a wobbling movement relative to the nut or head 40 and thus adjust itself to the walls of the cylinder. This same construction may be used in connection with a piston having a double feather edge, as brought out in Fig. 5, it being only necessary to provide one of the disks 36 with a feather or knife edge flange 44.

From the foregoing it will be observed that the various pistons include sheet metal feather edge cups of one form or another permitting of various types of pistons being produced, especially for grease pumps, lubricant cups and the like and so far I have only considered the loading of the pump cylinder 1 by removing the end cap 3. Now, it is obvious that any vacuous space may be filled, irrespective of the size of the filling opening, therefore, the end cap 3 may be left on the pump cylinder, the nipple 4, its hose or any other connection immersed in the grease; and a vacuum produced to suck the grease through the filling opening. These operations lead to a method of transferring a heavy grease which may be characterized as follows:—First, providing a vacuum producing instrumentality; second, immersing a portion of the instrumentality in the grease to be transferred, and then operating the vacuum producing instrumentality to produce a vacuum above the grease and cause the grease to move in the direction of the vacuum producing instrumentality. In this invention the grease enters the instrumentality and is later ejected therefrom.

I desire to point out that during an intake or suction stroke of the compound piston should there be leakage at the inner piston the feather edge of the outer piston is immediately brought into action to insure a seal for vacuum producing purposes.

While in the drawing there are illustrated the preferred embodiments for accomplishing the above results, it will be understood that the structural elements are susceptible to such variations and modifications as fall within the scope of the appended claims.

What I claim is:—

1. A piston having a feather edge active on the outstroke of the piston and inactive on the instroke of the piston, said piston having another feather edge active on the instroke of the piston and inactive on the outstroke of the piston, and operating means for the piston having a universal connection therewith to permit of said piston adjusting itself relative to a cylinder wall.

2. A piston comprising feather edge cups, a packing member, a piston rod, and means associated with one of said cups connecting said cup to said piston rod so that the other cup and packing member are operatively held by said piston rod.

3. A piston comprising a disk having a feather edge and a central pressed out enlargement adapted to receive the end of a piston rod, the disk enlargement permitting of a wobbling movement of the piston.

4. The combination of a piston rod, a head carried thereby, a feather edge sheet metal piston loose on said head, and means carried by said piston retaining it in engagement with said head.

5. The combination of a piston rod, a head carried thereby, a feather edge piston fixed to said rod, and a feather edge piston loose on said head, said pistons cooperating in forming a double acting piston on the end of said piston rod.

In testimony whereof I affix my signature in presence of two witnesses.

OLIVER E. BARTHEL.

Witnesses:
 ANNA M. DORR,
 KARL H. BUTLER.